US009781649B2

(12) United States Patent
Lee et al.

(10) Patent No.: US 9,781,649 B2
(45) Date of Patent: Oct. 3, 2017

(54) MBMS SUPPORT IN HETEROGENEOUS NETWORK AND IN-VENUE

(71) Applicant: QUALCOMM Incorporated, San Diego, CA (US)

(72) Inventors: Kuo-Chun Lee, San Diego, CA (US); Jun Wang, San Diego, CA (US); Nagaraju Naik, San Diego, CA (US); Sivaramakrishna Veerepalli, San Diego, CA (US); Ralph Akram Gholmieh, San Diego, CA (US); Gordon Kent Walker, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 13/956,119

(22) Filed: Jul. 31, 2013

(65) Prior Publication Data

US 2014/0036755 A1 Feb. 6, 2014

Related U.S. Application Data

(60) Provisional application No. 61/679,049, filed on Aug. 2, 2012.

(51) Int. Cl.
*H04W 36/26* (2009.01)
*H04W 72/04* (2009.01)
(Continued)

(52) U.S. Cl.
CPC ......... *H04W 36/26* (2013.01); *H04W 72/042* (2013.01); *H04W 36/0061* (2013.01); *H04W 72/005* (2013.01)

(58) Field of Classification Search
None
See application file for complete search history.

(56) References Cited

U.S. PATENT DOCUMENTS 8,064,820 B2  11/2011 Hyun et al.
8,254,299 B2  8/2012 Kim
(Continued)

FOREIGN PATENT DOCUMENTS

EP    2152030 A1    2/2010
JP    2009182944 A  8/2009
(Continued)

OTHER PUBLICATIONS

International Search Report and Written Opinion—PCTAJS2013/053304—ISA/EPO—Oct. 30, 2013.
(Continued)

*Primary Examiner* — Michael Thier
*Assistant Examiner* — Kent Krueger
(74) *Attorney, Agent, or Firm* — Anthony R. Morris

(57) ABSTRACT

A method, an apparatus, and a computer program product for wireless communication enable user equipment operating in a current cell that provides a multimedia broadcast/multicast service to distinguish between neighboring cells that have different operational characteristics. The presence of a neighboring cell is identified while the user equipment is operating in a first cell and it is determined whether the neighboring cell provides services different from the services provided in the current cell, based on information maintained by the user equipment. The user equipment may move to the neighboring cell to obtain better or different service.

46 Claims, 14 Drawing Sheets

(51) Int. Cl.
*H04W 36/00* (2009.01)
*H04W 72/00* (2009.01)

(56) References Cited

U.S. PATENT DOCUMENTS

| | | |
|---|---|---|
| 2010/0080163 A1 | 4/2010 | Krishnamoorthi et al. |
| 2011/0149827 A1 | 6/2011 | Na et al. |
| 2011/0190000 A1 | 8/2011 | Kwun |
| 2011/0305183 A1 | 12/2011 | Hsu et al. |
| 2012/0082064 A1 | 4/2012 | Awoniyi et al. |

FOREIGN PATENT DOCUMENTS

| | | |
|---|---|---|
| JP | 2011234039 A | 11/2011 |
| WO | 2011157216 A1 | 12/2011 |

OTHER PUBLICATIONS

Qualcomm Incorporated et al: "Additional Assistance Information for MBMS UEs", 3GPP Draft; R2-124058, 3rd Generation Partnership Project (3GPP), Mobile Competence Centre; 650, Route Des Lucioles; F-06921 Sophia-Antipolis Cedex; France vol. RAN WG2, No. Qingdao, China; 20120813-20120817, Aug. 7, 2012 (Aug. 7, 2012), XP050665777.

Samsung: "SAI broadcast for nationwide MBMS service", 3GPP Draft; R2-122636 on SAI Broadcast for Nationwide Service, 3rd Generation Partnership Project (3GPP), Mobile Competence Centre ; 650, Route Des Lucioles ; F-06921 Sophia-Antipolis Cedex ; France, vol. RAN WG2, No. Prague; 20120521-20120525, May 15, 2012 (2812-05-15), XP050607344, [retrieved on May 15, 2012] the whole document.

ZTE: "Including MBSFN area ID into EUTRAN MBMS Assistance Information", 3GPP Draft; R2-121261 Including MBSFN Area ID Into EUTRAN MBMS Assistance Information, 3rd Generation Partnership Project (3GPP), Mobile Competence Centre; 650, Route Des Lucioles ; F-06921 Sophia-Antipolis Cedex ; France, vol. RAN WG2, No. Jeju, Korea; 20120324-20120330, Mar. 20, 2012 (Mar. 20, 2012), XP050606214, [retrieved on Mar. 20, 2012] the whole document.

MBMS SUPPORT IN HETEROGENEOUS NETWORK AND IN-VENUE

CROSS-REFERENCE TO RELATED APPLICATION(S)

This application claims the benefit of U.S. Provisional Application Ser. No. 61/679,049, entitled "MBMS SUPPORT IN HETEROGENEOUS NETWORK AND IN-VENUE" and filed on Aug. 2, 2012, which is expressly incorporated by reference herein in its entirety.

BACKGROUND

Field

The present disclosure relates generally to communication systems, and more particularly, to a wireless system providing broadcast, multicast and unicast services.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided that enable a user equipment (UE) operating in network that provides a multimedia broadcast/multicast service (MBMS) to distinguish between neighboring cells that have different operational characteristics. For example, the UE may determine if a small cell provides a broadcast service or a boosted unicast service so that the UE can determine if it needs to switch into the neighboring cell to receive the corresponding services.

In an aspect of the disclosure, a method is provided that includes identifying the presence of a neighboring cell while operating in a first cell that provides MBMS, determining at a UE whether the neighboring cell provides an MBMS service that is different from, or the same as the MBMS service provided in the first cell, based on information maintained by the UE characterizing the neighboring cell. The method further includes determining at the UE whether the neighboring cell provides in-venue service or boosted unicast service based on information maintained by the UE characterizing the neighboring cell, and moving to the neighboring cell when the neighboring cell is determined to provide the in-venue service or a broadcast or multicast service that is also provided in the first cell and when the UE is receiving MBMS service in the first cell, or when the UE is receiving broadcast or multicast service in the first cell and the neighboring cell is determined to provide the boosted unicast service or a different broadcast or multicast service than provided in the first cell.

In an aspect of the disclosure, the first cell comprises a heterogeneous network including a macro cell and one or more small cells. At least the neighboring cell may be included in the one or more small cells.

In an aspect of the disclosure, the method includes receiving a system information block (SIB) while the UE is operating in the first cell. The SIB may include a service area identity (SAI) associated with one or more cells. The SIB may include a physical cell identity (PCI) of the neighboring cell. The UE may determine whether the neighboring cell provides different MBMS service (e.g. in-venue service), the same MBMS service, or boosted unicast service based on the PCI. The PCI may be one of a first plurality of PCIs reserved by a network operator for cells providing in-venue service, or one of a second plurality of PCIs used by cells providing boosted unicast service. The PCI may be one of a plurality of predefined PCIs reserved for cells providing in-venue service.

In an aspect of the disclosure, the SIB comprises information mapping the SAI to a list of PCI associated with neighboring cells. The information mapping the SAI to PCIs associated with the neighboring cell may be generated based on characteristics of the neighboring cells. The information mapping the SAI to the PCIs associated with the neighboring cells may be provided by a network entity based on characteristics of the neighboring cells reported by the neighboring cells. The information mapping the SAI to the PCIs associated with the neighboring cells may be provided by a base station of the first cell.

In an aspect of the disclosure, the SIB comprises information identifying a frequency associated with the first cell, a frequency associated with the neighboring cell and at least one SAI. The SIB may identify an SAI of the neighboring cell. The SAI of the neighboring cell may correspond to an in-venue service.

In an aspect of the disclosure, the method includes moving to the neighboring cell when the neighboring cell is determined to provide the in-venue service when the first cell does not provide the in-venue service. Moving to the neighboring cell when the first cell does not provide the in-venue service may include indicating the availability of the in-venue service to a user of the UE, and moving to the neighboring cell when the user selects the in-venue service. The method may include terminating a national service available in the first cell when the user selects in-venue service.

In an aspect of the disclosure, the method includes moving to the neighboring cell when the neighboring cell is determined to provide the MBMS service that is different from the MBMS service provided in the first cell. The UE may indicate the availability of the MBMS services provided by the neighboring cells to a user of the UE, and move to the neighboring cell when the user selects one of the MBMS services. The method may include terminating a service available in the first cell when the user selects the MBMS service in the neighboring cell that is different from the MBMS service provided in the first cell.

DETAILED DESCRIPTION

Figure 1:
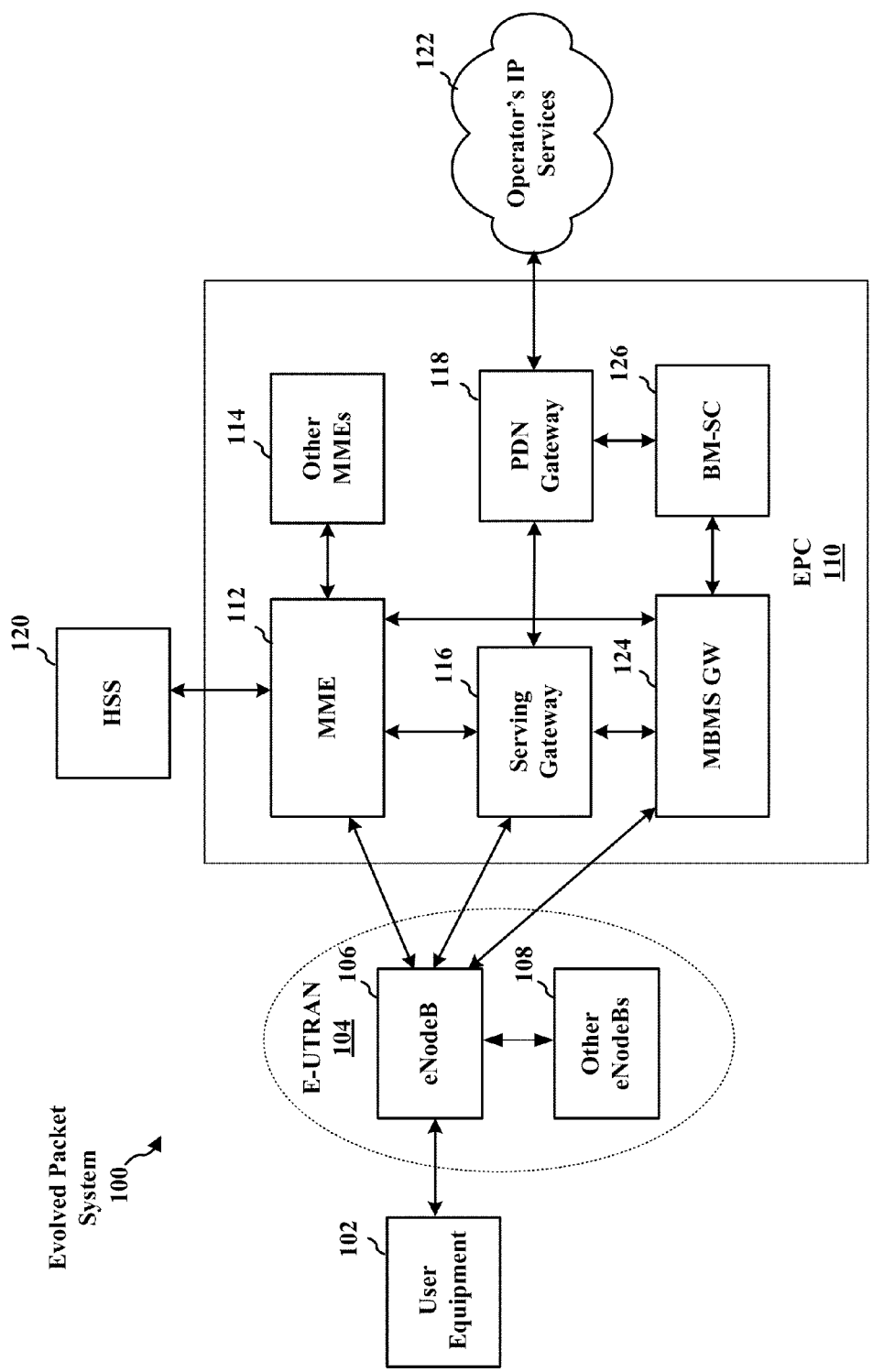
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
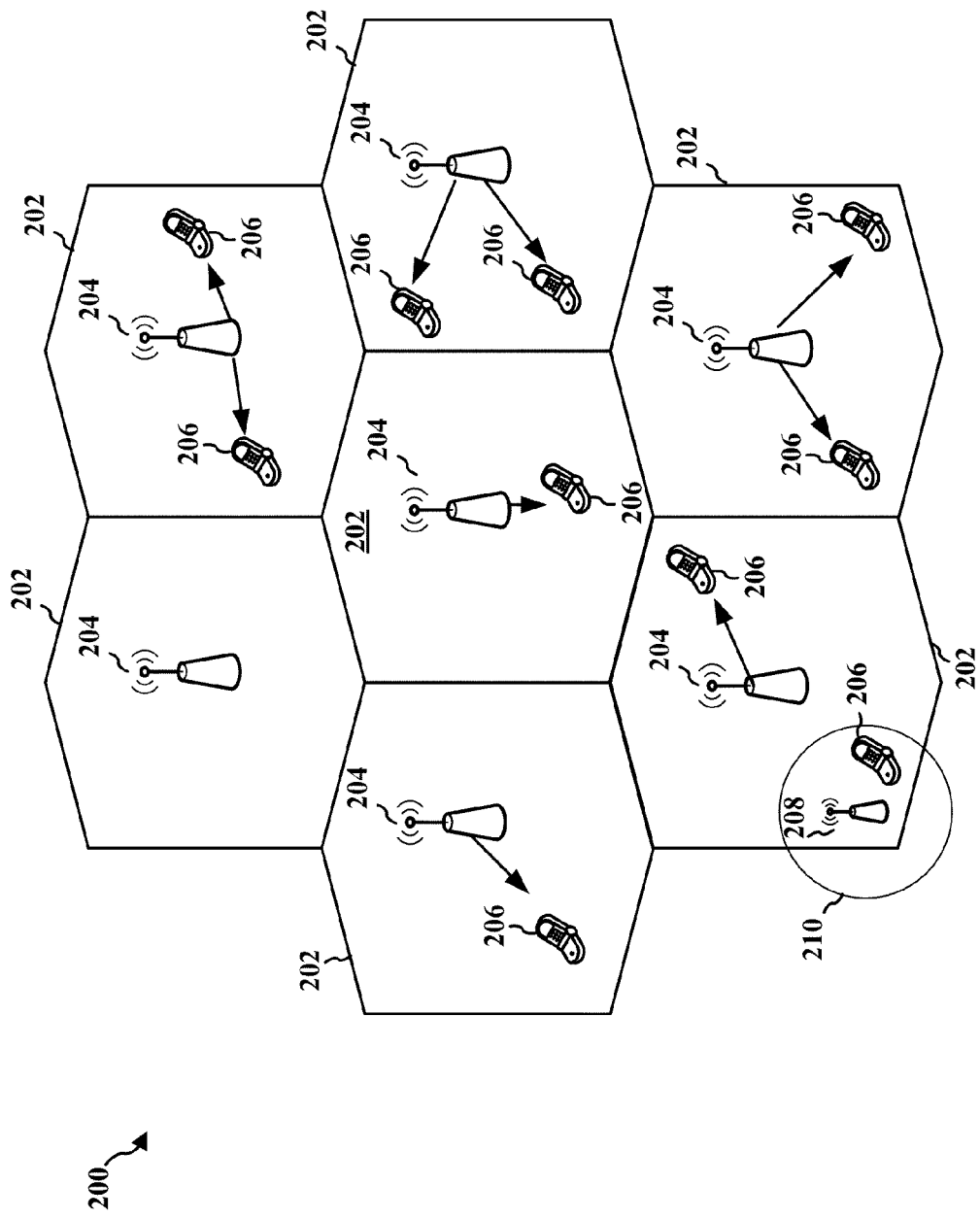
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
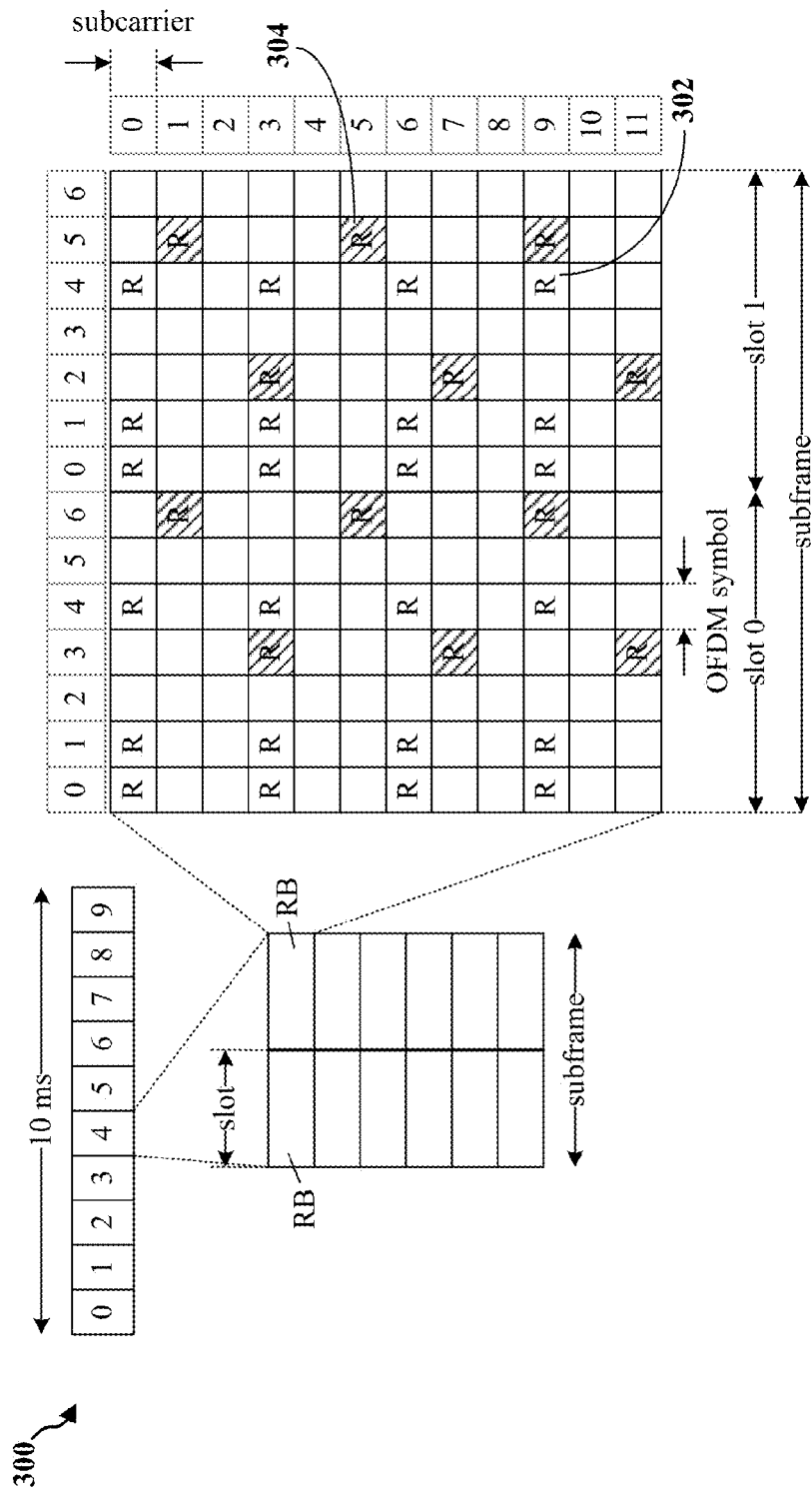
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
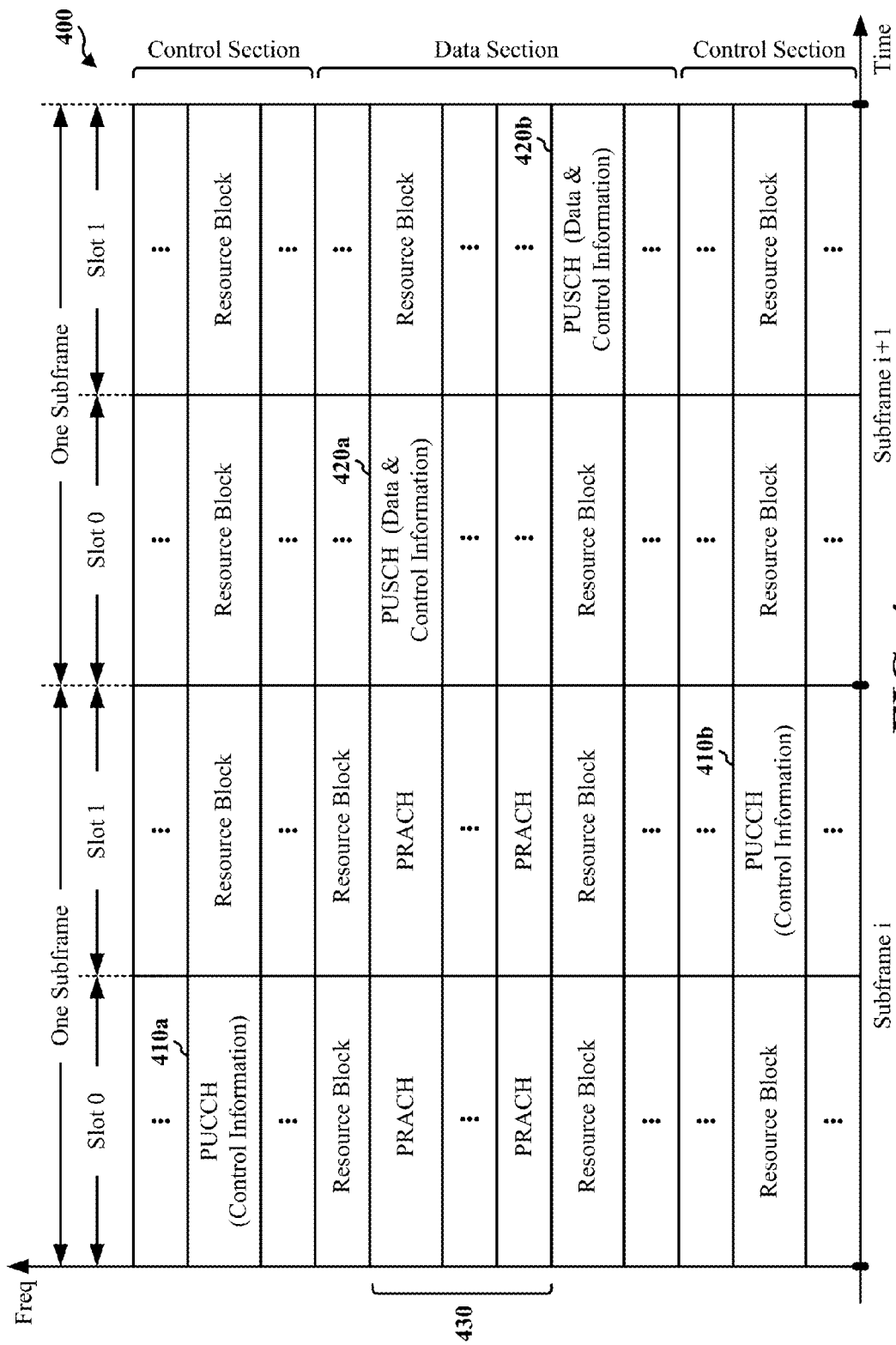
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
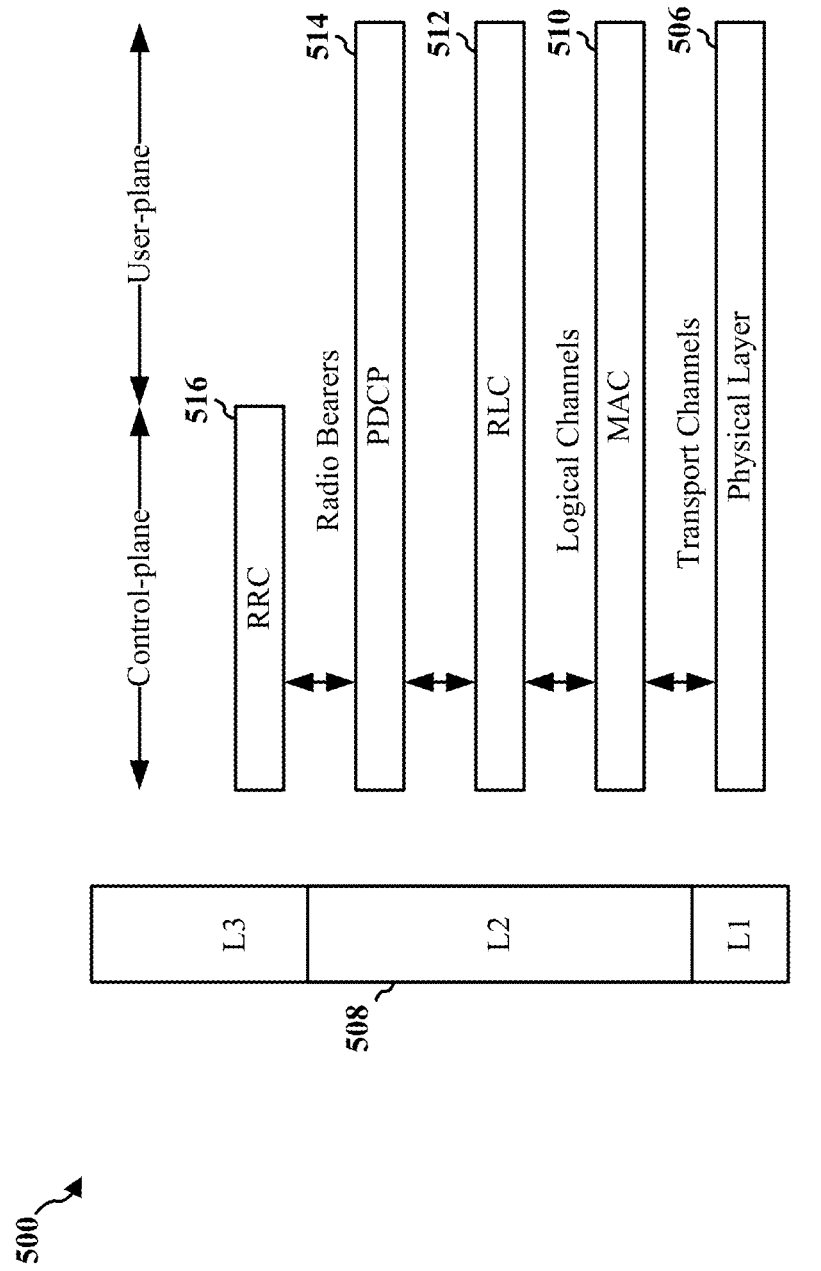
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
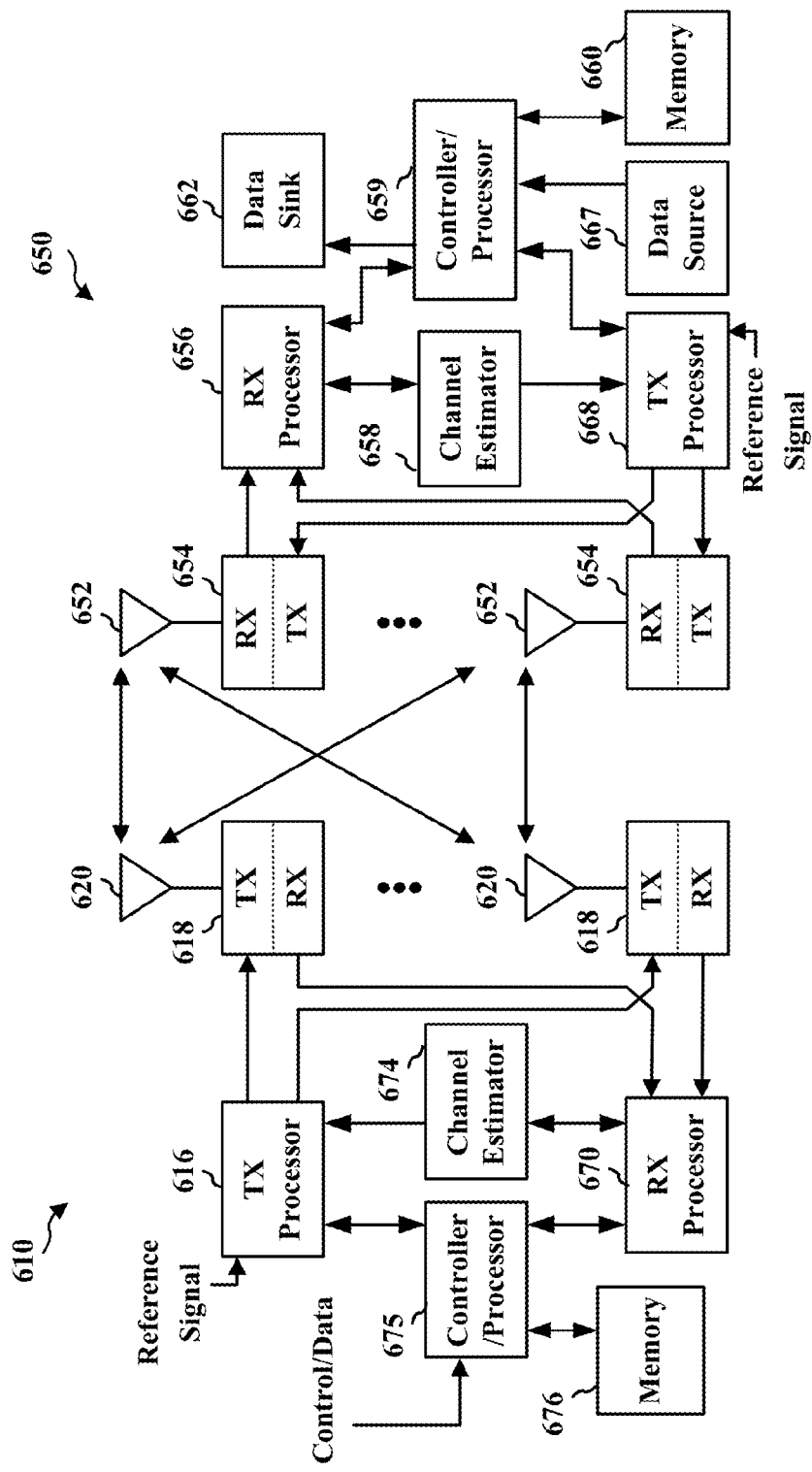
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
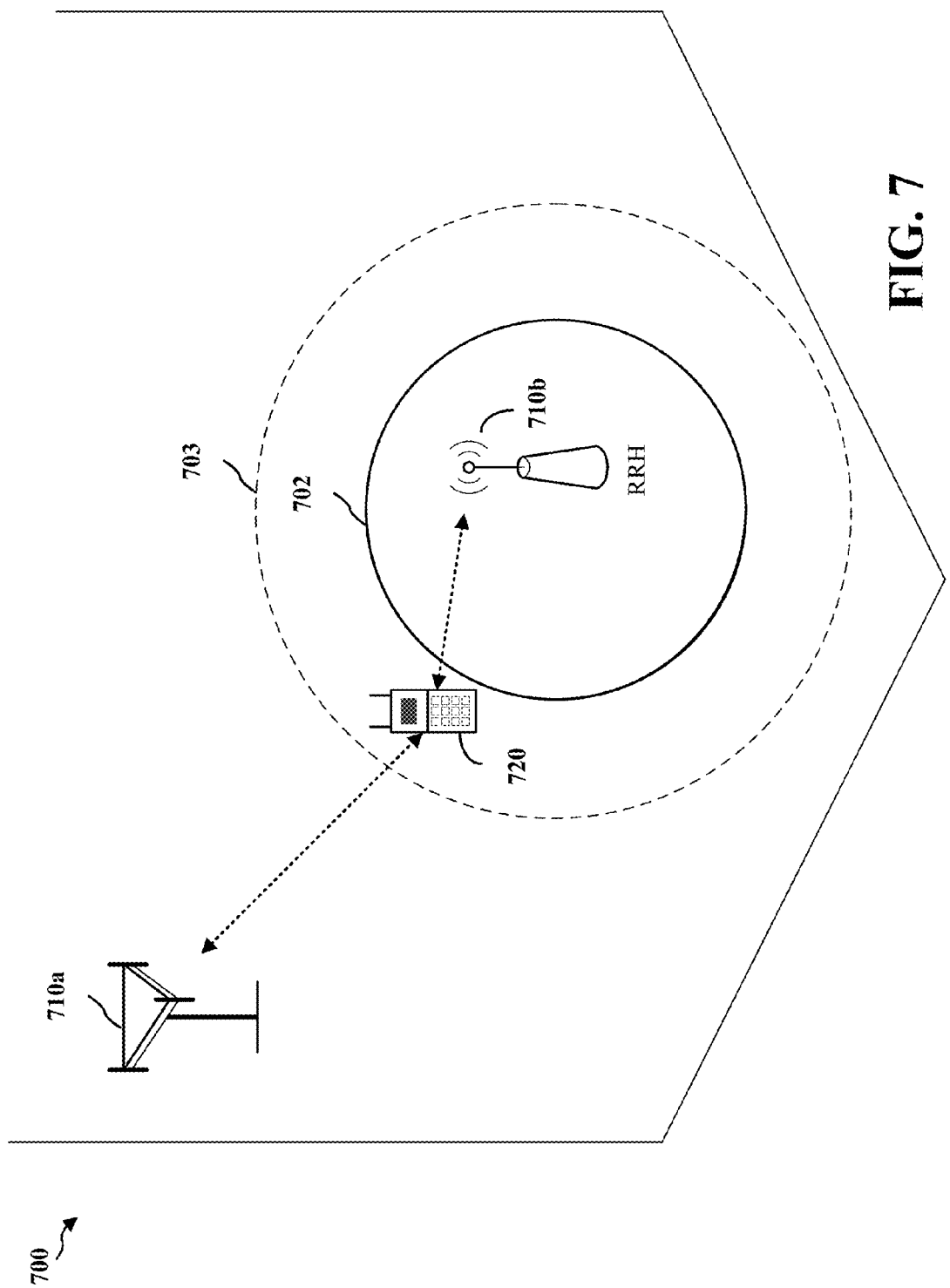
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710*b* may have a range expanded cellular region 703 that is expanded from the cellular region 702 through enhanced inter-cell interference coordination between the RRH 710*b* and the macro eNB 710*a* and through interference cancellation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8B:
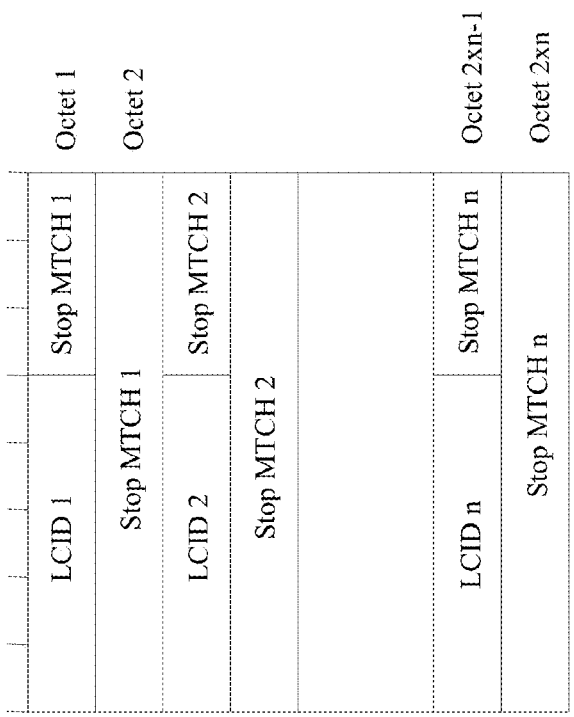
FIG. 8B is a diagram illustrating a format of a Multicast Channel Scheduling Information Media Access Control control element.
Figure 8A:
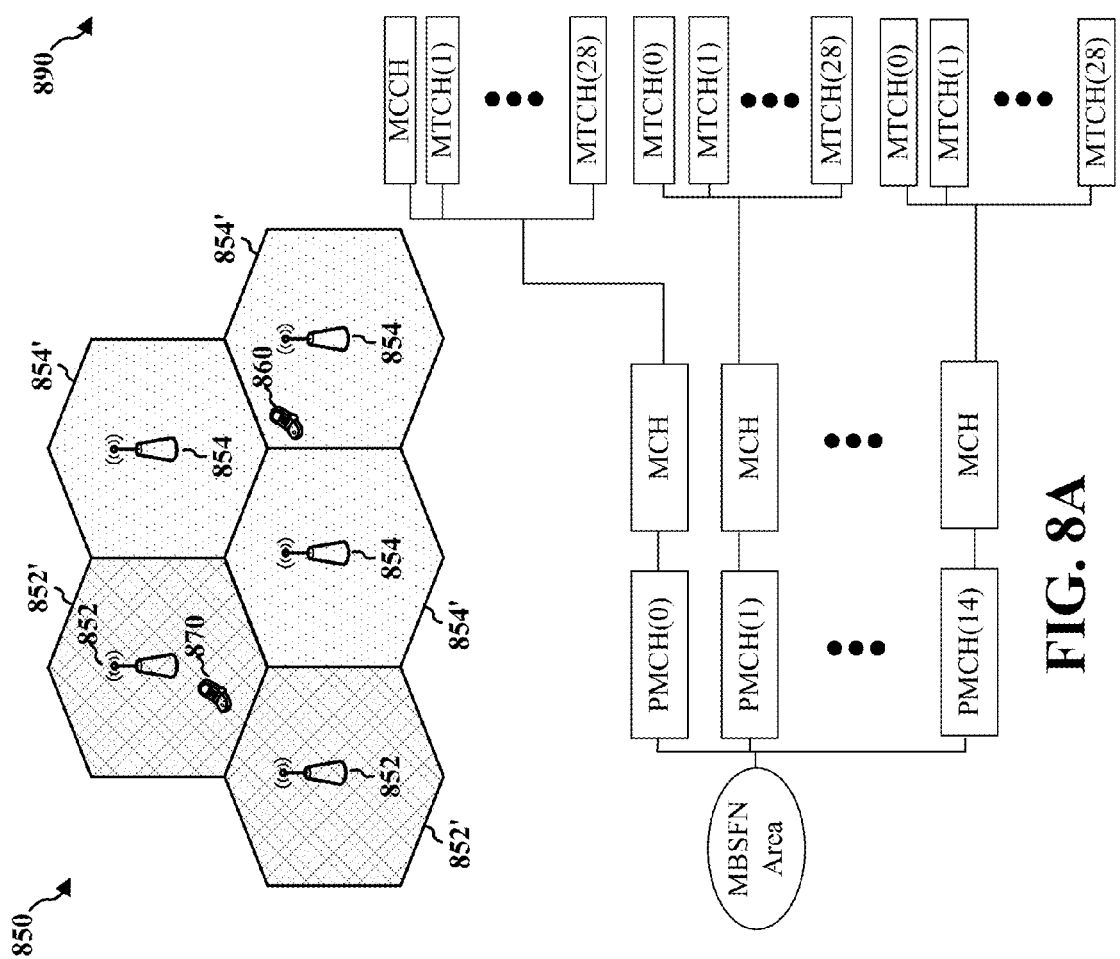
FIG. 8A is a diagram illustrating an example of an evolved Multimedia Broadcast Multicast Service channel configuration in a Multicast Broadcast Single Frequency Network.

FIG. 8A is a diagram 850 illustrating an example of an evolved MBMS (eMBMS) channel configuration in an MBSFN. The eNBs 852 in cells 852' may form a first MBSFN area and the eNBs 854 in cells 854' may form a second MBSFN area. The eNBs 852, 854 may each be associated with other MBSFN areas, for example, up to a total of eight MBSFN areas. A cell within an MBSFN area may be designated a reserved cell. Reserved cells do not provide multicast/broadcast content, but are time-synchronized to the cells 852', 854' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 8A, the first MBSFN area may support a first eMBMS broadcast service, such as by providing a particular news broadcast to UE 870. The second MBSFN area may support a second eMBMS broadcast service, such as by providing a different news broadcast to UE 860. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 indicates (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message indicates both (1) a temporary mobile group identity (TMGI) and an optional session identifier of each MTCH identified by a logical channel identifier within the PMCH, (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 8B is a diagram 890 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 9:
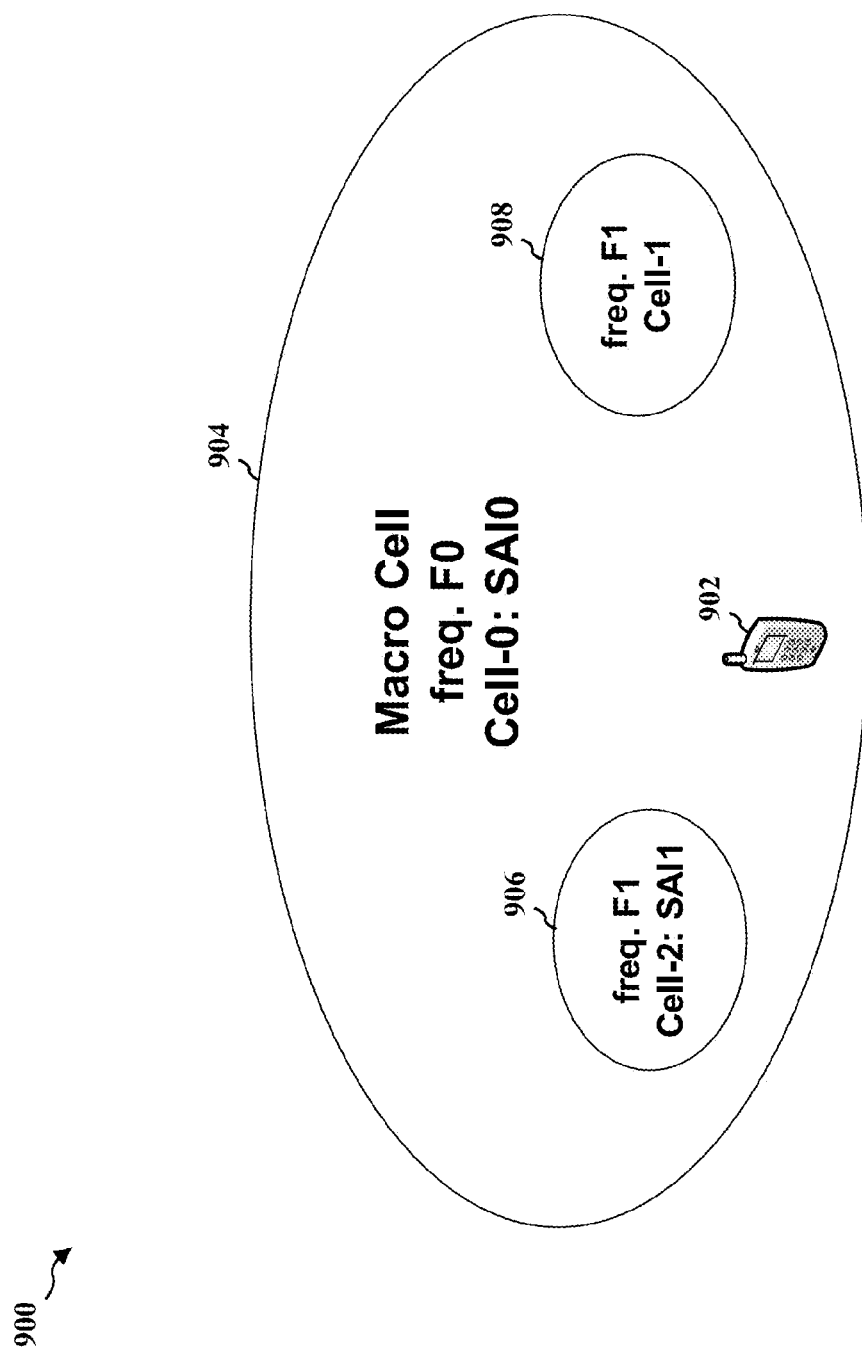
FIG. 9 illustrates certain aspects related to mobility and in-venue and boosted multicast service.

FIG. 9 is a simplified diagram illustrating a use of lower power class eNBs, including for example, femto cells, micro cells, and pico cells, to provide different MBMS services, such as in-venue broadcast service, and boosted unicast service. Lower power class eNBs may be referred herein to as "small cells." "Boosted unicast" corresponds to an increased capacity for unicast traffic provided, for example, by a small cell. In the illustrated example, a UE 902 is initially operating in a high power class eNB or macro cell 904 that may be providing a broadcast service associated with a sporting event, or other event. The broadcast service may be widely distributed within one service area (SAI0) and may include, for example, a national broadcast program. In the example, the UE 902 has entered an arena, stadium or other venue in which associated broadcast versions of the event are available.

A first small cell 908 may be provided within the coverage area of the macro cell 904 to boost unicast service in order to increase unicast capacity by providing, for example, a hotspot. Although only one unicast-boosting cell 908 is illustrated, additional small cells may be provided within the coverage area of the macro cell 904 to further increase unicast capacity. One or more second small cells 906 may be provided within the coverage area of the macro cell 904 to boost multicast service and/or to provide in-venue access to additional video feeds or other feeds associated with the event. "Boosted multicast service" corresponds to eMBMS services provided by a small cell that can provide more video feeds than the macro cell. The additional feeds may relate to a sporting event in a stadium and include viewing angles and in-stadium audio that is not provided in the national broadcast of the event.

Multiband national/regional service or in-venue services may be deployed on one or more frequencies. For example, one frequency (Fx, a first band) may be used nationally to carry national/regional MBMS broadcast service, while another frequency (Fy, e.g. a second band) may be used to send different programs (such as in-venue service), the same program to boost multicast services, and/or no MBMS to boost unicast capacity. National content provided on Fx may be duplicated on Fy in-venue service, although in-venue service is typically not duplicated on Fx. Frequency Fy in some areas may be used only for boosting unicast service capacity. In such areas Fy typically does not carry in-venue service, and may not carry national services.

Aspects disclosed herein provide information to a UE that enable the UE to determine a type of service (e.g., in-venue service, boosted unicast, or boosted broadcast/multicast service) provided by a neighboring small cell operating within or otherwise associated with the coverage area of a serving macro cell. The information may be provided by the serving macro cell so that the UE does not have to switch to neighbor frequencies or cells to obtain the information. To this end, information may be included in a broadcast message, e.g., SIB15, broadcast by the macro cell serving the UE. The information may include service area identity (SAI) information and, in some cases, physical cell identity (PCI) information.

SAIs are a means by which a UE may search for an eMBMS service of interest. An SAI identifies the groups of cells where an eMBMS service is available. The network sends a user service description (USD) to the UE containing all the eMBMS services provided by the network, the protocol configuration needed to receive the eMBMS services and the SAIs and associated frequencies where each eMBMS service is available.

The eNB serving the UE may broadcast SIB15 to indicate the available SAIs of the current coverage. SIB15 may indicate the SAI list of the serving frequency and the SAI list of each neighbor frequency. When the UE is interested in receiving a particular eMBMS service, the UE uses the USD to determine the SAIs and frequencies where the eMBMS service is available and uses the information broadcast in SIB15 to discover the SAIs of the current coverage. Based on these two pieces of information, the UE may determine if an eMBMS of interest is available in the current coverage and, if so, the frequency on which the service is available.

In some cases, a small cell may be on the same frequency as the macro cell, and the macro cell may have the SAI associated with it that is carrying the eMBMS service of interest. The small cell, however, may or may not carry the eMBMS service of interest even though it is on the same frequency. Accordingly, in a further aspect disclosed herein, additional information is provided to the UE, to inform the UE of the type of service of the small cell. The additional information may be provided by PCIs. As described further below with reference to FIGS. 10 and 11, specific PCIs may identify the service type of the cell to which the PCI is assigned. Based on a mapping between PCIs and SAIs provided in SIB15, a UE may determine if a small cell on the same frequency as the macro cell carries the eMBMS service of interest.

In some embodiments, a system information block (SIB), such as SIB15, may be used to provide a UE 902 with a service area identity (SAI) list of the serving frequency and neighbor frequencies in order to provide service continuity for MBMS reception without requiring the UE 902 to switch to neighbor frequencies and/or cells to read the corresponding SIBs. SIB15 may be provided by a serving eNB to a UE 902 that is receiving MBMS. This may be done to provide information including one or more of the SAIs of the current frequency and a list of SAIs for each neighboring MBMS frequency (or cell). Such use of SIB15 can provide MBMS service continuity by sending MBMS service area availability information to the UE 902 so that the UE 902 does not have to tune to another frequency to read SIB and MCCH for that frequency.

HetNet deployments may use multiple small cells 906, 908 to boost capacity within the macro cell and enrich user experience by providing access to increased bandwidth within the range of small cells 906, 908. Some embodiments provide additional information and/or configurability that allow a UE 902 to distinguish if the UE 902 is entering the in-venue coverage or boosted coverage when, for example, the UE 902 is moving from a first frequency band coverage of the macro cell to a second frequency band coverage offered by a second small cell 906, or the UE 902 is moving toward boosted coverage offered by a first small cell 908. In one example, when the UE 902 is operating in the macro cell 904 on the first frequency band and detects the availability of the second frequency band coverage from the second pico cell 906, it may elect to remain on the first frequency band until the MBMS session has completed if, for example the MBMS service is unavailable on the second frequency band. The decision to change to a different service area may be made by a user of UE 902. For example, the UE 902 may indicate availability of in-venue content to a user of the UE 902, allowing the user to decide whether to end national broadcast service and select in-venue content for viewing. Alternatively, the UE may be preconfigured to switch to in-venue service when available if the UE is currently receiving the corresponding national broadcast service. The pre-configuration may be based on user preferences or may be done by the network provider.

Figure 10:
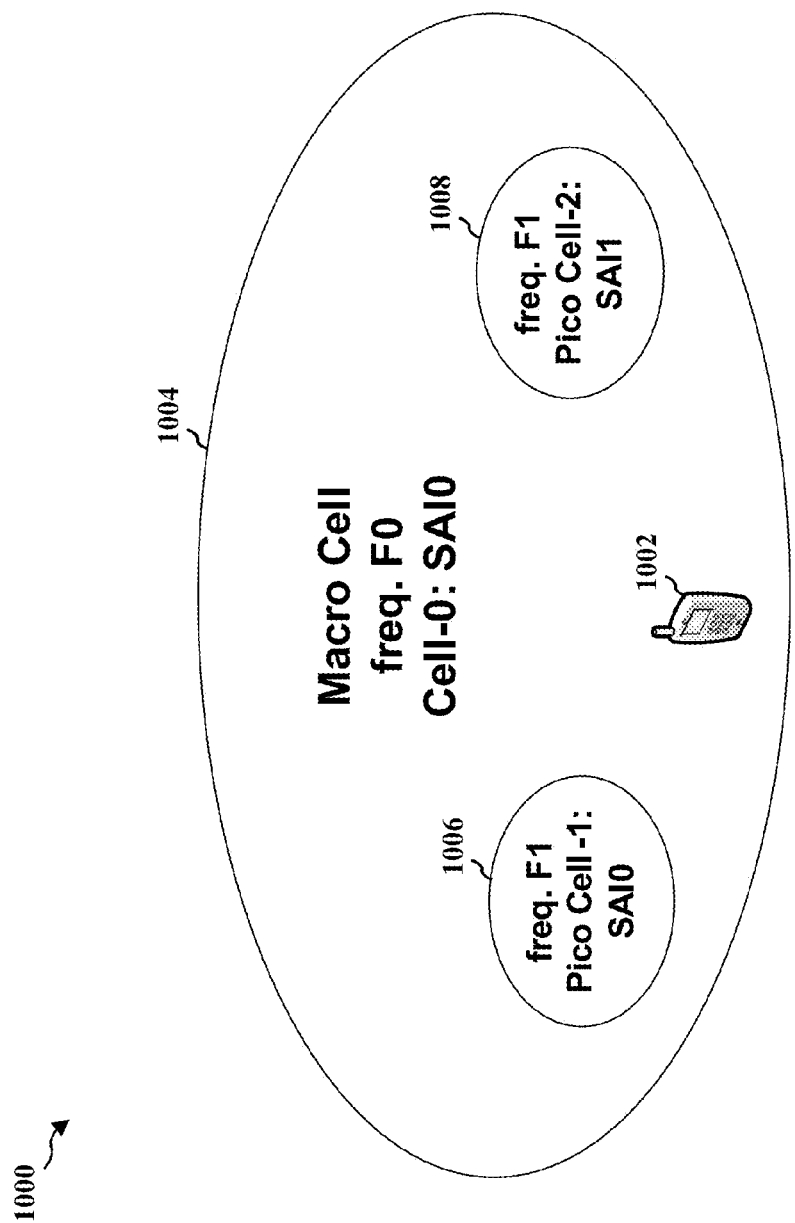
FIG. 10 illustrates certain aspects related to MBMS in heterogeneous network and in-venue.

In the example 1000 depicted in FIG. 10, a first macro cell 1004 may operate using a first frequency F0 to provide MBMS support with SAI0. National MBMS programming may be provided in SAI0. A first small cell 1006 may be operating on a second frequency F1 with SAI0 and may be used for boosting unicast capacity, and to provide the same national MBMS program as provided by macro cell 1004. A second small cell 1008 may be operating on frequency F1 with SAI1 and may be used to provide MBMS services different than those provided on in SAI0. The services provided in SAI1 may comprise in-venue services in a stadium or other venue. For this scenario:

SIB15 broadcast by the macro cell 1004 eNB may comprise SAI0 of F0 (the serving frequency); F1 (neighbor frequency) and associated SAI0 and SAI1;

SIB15 broadcast by the first small cell 1006 may comprise SAI0 of F1 (the serving frequency); F0 (neighbor frequency) and associated SAI0;

SIB15 broadcast by the second small cell 1008 may comprise SAI1 of F1 (the serving frequency); F0 (neighbor frequency) and associated SAI0.

Some embodiments described herein enable the UE 1002, when moving into coverage of a small cell 1006, 1008 from macro cell 1004, to distinguish whether the UE 1002 is entering the first small cell 1006 or the second small cell 1008. Accordingly, the UE 1002 may elect to switch to F1 to continue the service if small cell 1008 on F1 provides relatively higher signal strength than macro cell 1004. However, when the UE 1002 is within macro cell 1004 coverage with reception of MBMS service provided in SAI0 when moving to small cell 1006, the UE may not want to switch to F1 as long as the UE can receive sufficient signal strength from macro cell 1004 if F1 provides different MBMS services. Furthermore, the UE 1002 may determine which MBMS services are provided by small cell 1006 under SAI1, and UE 1002 may indicate the availability of such services to a user.

Figure 11:
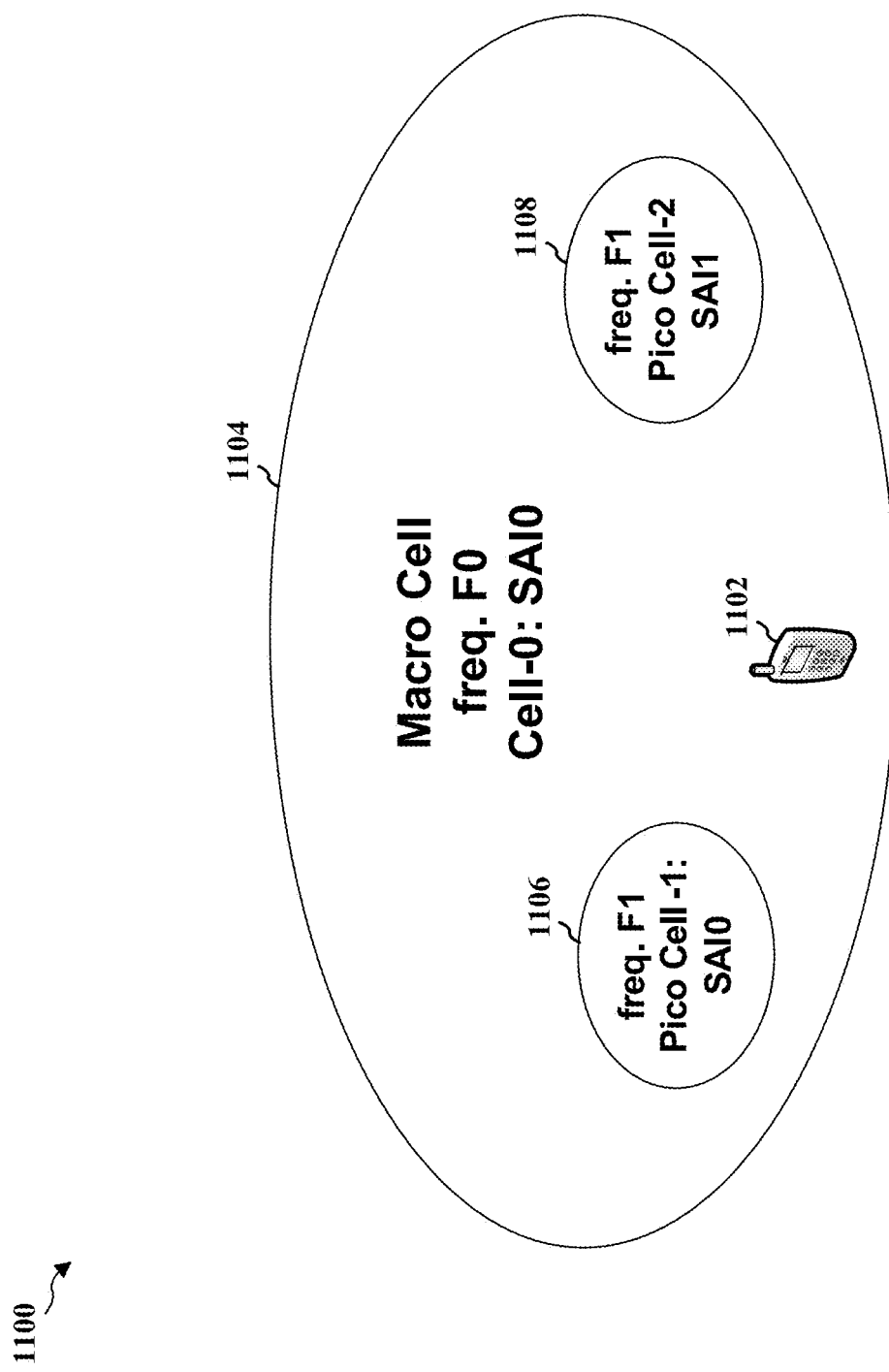
FIG. 11 illustrates certain aspects related to MBMS in heterogeneous network and in-venue.

In the example 1100 shown in FIG. 11, the coverage of macro cell 1104 operating in one frequency band may include a plurality of small cells 1106, 1108, some of which may provide the same MBMS service, some of which may provide no MBMS service, while others provide different MBMS services in another frequency band. Macro cell 1104 on frequency F0 may provide MBMS service with SAI0, which may include a national MBMS program. A first small cell 1106 may not support MBMS service and may be used to boost unicast capacity. A second small cell 1108 on frequency F1 with SAI1 may provide a different MBMS service than provided on frequency F0, including for example in-venue services in a stadium. In this example:

SIB15 broadcast by the macro cell 1104 eNB may comprise SAI0 of F0 (the serving frequency); F1 (neighbor frequency) and associated SAI1;

SIB15 sent by the first small cell 1106 may comprise F0 (neighbor frequency) only, and associated SAI0 because the serving frequency doesn't support any MBMS services;

SIB15 sent by the second small cell 1108 may comprise SAI1 of F1 (the serving frequency); F0 (neighbor frequency) and associated SAI0.

Some embodiments described herein enable a UE 1102, when moving to a small cell 1106 or 1108 from a macro cell 1104 to distinguish whether the UE 902 is entering the first small cell 1106 or the second small cell 1108. Accordingly, the UE 1102 approaching the first small cell 1106 may elect not to switch to F1 when the UE 902 is within the coverage of the macro cell 904 with reception of a MBMS service provided in SAI0 as long as the UE 902 can receive sufficient signal strength from the macro cell 904 eNB, because for example, F1 provides no MBMS services. When the UE 902 is within the macro cell 904 coverage with reception of an MBMS service provided in SAI0, and if it is moving to the second small cell 1108, the UE 902 may indicate the MBMS services the second small cell 1108 provides under SAI1 to a user of the UE 1102. The UE 1102 may be preconfigured or may receive input that indicates whether the UE 1102 should select between continuing receiving current MBMS service and choosing to terminate reception of current MBMS service and elect the services that provided by the second small cell 1106, which may include, for example, in-venue services).

In certain embodiments, a UE may use Physical Cell ID (PCI) information received in a primary synchronization signal (PSS) and in a secondary synchronization signal (SSS) to determine if in-venue or boosted area services are available nearby. Such determination can be made in both idle state and connected state. PSS can provide a cell index, which can have one of 3 values (0, 1, 2), while SSS provides a cell group ID that may range between 0 and 167. Accordingly, a total of 504 (163*3) PCIs may be available.

In some embodiments, a network operator may reserve specific PCIs to identify cells providing in-venue services (in-venue PCIs). In one example, PCIs from 0 to 30 may be reserved for base stations serving cells that provide in-venue services, and a UE may be pre-configured with the PCIs identifying cells that provide in-venue services. When a UE detects a PCIs that corresponds to an in-venue base station, the UE may detect its proximity to in-venue coverage.

In some embodiments, the allocation of PCIs used for in-venue service can be agreed among vendors and operators. Typically such agreement may be made through industry organizations such as the GSM Association (GSMA). In one example, in-venue base stations may be assigned PCIs having values beginning at 0 and progressing upwards, while boosted area base stations may be assigned PCIs having values beginning at 503 and progressing downwards. When a UE detects PCIs that correspond to an in-venue base station, the UE may detect its proximity to in-venue coverage.

In some embodiments, PCIs can be associated with in-venue service by providing information in SIBs elements related to neighbor frequencies. For example, such information can be provided in SIB15, discussed herein. A UE may maintain information that identifies SAIs associated with in-venue content that may be provided in SIBs received from USD, and/or preconfigured. From the mapping information between SAIs and PCIs provided in SIB15, a UE may determine when it is entering an in-venue area. An example of an SIB configuration is shown below in Table 1.

TABLE 1

System Information Block Type15 Information Element

```
-- ASN1START
SystemInformationBlock-         SEQUENCE {
Type15-r11 ::=
    sai-IntraFreq-r11           MBMS-SAI-List-    OPTIONAL,
                                -r11
    -- Need OR
    sai-InterFreqList-r11       MBMS-SAI-Inter-   OPTIONAL,
                                FreqList-r11
    -- Need OR
    lateNonCriticalExtension    OCTET STRING      OPTIONAL,
    -- Need OP
    ...
}
MBMS-SAI-List-r11 ::=           SEQUENCE {(SIZE (1..maxSAI-
MBMS-r11)) OF MBMS-SAI-r11
    MBMS-SAI-r11 ::=            SEQUENCE {
    sai                         INTEGER (0..65535)
    physCellIdList-r11          SEQUENCE (SIZE (1..40)) OF
                                PhysCellId,
OPTIONAL,-- Need OR
    ...
}
MBMS-SAI-InterFreqList-r11 ::=  SEQUENCE (SIZE (1..maxFreq))
OF MBMS-SAI-InterFreq-r11
MBMS-SAI-InterFreq-r11 ::=      SEQUENCE {
    dl-CarrierFreq              ARFCN-ValueEUTRA,
    sai-List-r11                MBMS-SAI-List-r11,
    ...
}
MBMS-SAI-List-r11 ::=           SEQUENCE {(SIZE (1..maxSAI-
MBMS-r11)) OF MBMS-SAI-r11
    MBMS-SAI-r11 ::=            SEQUENCE {
    sai                         INTEGER (0..65535)
    physCellIdList-r11          SEQUENCE (SIZE (1..40)) OF
                                PhysCellId,
OPTIONAL,-- Need OR
)
    ...
}
-- ASN1STOP
```

In the example of FIG. 10, where a first small cell 1006 is used for boosting unicast capacity and to provide the same national MBMS program as the macro cell 1004, while a second small cell 1008 operates on frequency F1 with SAI1 and provide a MBMS services different than those provided on F0:

SIB15 broadcast by the macro cell 1004 comprises SAI0 of F0 (the serving frequency); F1 (the neighbor frequency) and associated {SAI0, PCI1} and {SAI1, PCI2};

SIB15 broadcast by the first small cell 1006 comprises SAI0 of F1 (the serving frequency); F0 (the neighbor frequency) and associated {SAI0, PCI0};

SIB15 broadcast by the second small cell 1008 comprises SAI1 of F1 (the serving frequency); F0 (the neighbor frequency) and associated {SAI0, PCI0}.

When the UE 1002 has detected the first and second small cells 1006, 1008 while operating in the macro cell 1004, the additional PCI information in SIB15 enables the UE 1002 to distinguish between the unicast services offered by the first small cell 1006, when it detects PCI1, and the in-venue services offered by the second small cell 1008 when it detects PCI2.

In the example of FIG. 11, with a macro cell 1104 that provides coverage in one frequency band, and that may include first and second small cells 1106, 1108, that provide different services in another frequency band, including different MBMS services, no MBMS service, and/or in-venue services:

SIB15 broadcast by the macro cell 1104 eNB comprises SAI0 of F0 (the serving frequency); F1 (the neighbor frequency) and associated {SAI1, PCI2};

SIB15 broadcast by the first small cell 1106 eNB comprises only F0 (the neighbor frequency) and associated {SAI0, PCI0};

SIB15 broadcast by the second small cell 1108 eNB comprises SAI1 of F1 (the serving frequency); F0 (the neighbor frequency) and associated {SAI0, PCI0}.

With the additional PCI information in SIB15, a UE 1102 moving from the macro cell 1104 to a small cell 1106, 1108 can distinguish between entering the first small cell 1106 when the UE 1102 detects PCI1 and entering the second small cell 1108 when the UE 1102 detects PCI2. This may permit the UE 902 to elect between staying in the macro cell 1104 and switching to the second small cell 1108.

In certain embodiments, when a UE 902 moves from a macro cell 904 to a small cell 908 providing boosted unicast service, the UE 902 may detect a PCI (PCI2) in PSS/SSS associated with the small cell 908, and the UE 902 may determine that PCI2 is not listed in SIB15 (see Table 1, below) provided by the macro cell 904. Therefore, the UE 902 may deduce or otherwise assume that the small cell 908 provides boosted unicast service.

In another example, when a UE 902 moves from the macro cell 904 to a small cell 906 providing in-venue service, the UE 902 may detect a PCI (PCI3) in PSS/SSS from the small cell 906. The UE 902 may determine that PCI3 is listed in SIB15 provided by macro cell 904. From the entry in the SIB, the UE 902 may determine that the small cell 906 may be providing in-venue service.

In Table 1, "sai-IntraFreq" contains the list of MBMS SAIs for the current frequency, "sai-InterFreqList" contains a list of neighboring frequencies that provide MBMS services and the corresponding MBMS SAIs, "sai-List" contains a list of MBMS SAIs for a specific frequency, and "physCellId-List" contains a list of physical cell IDs for a specific SAI.

Figure 12:
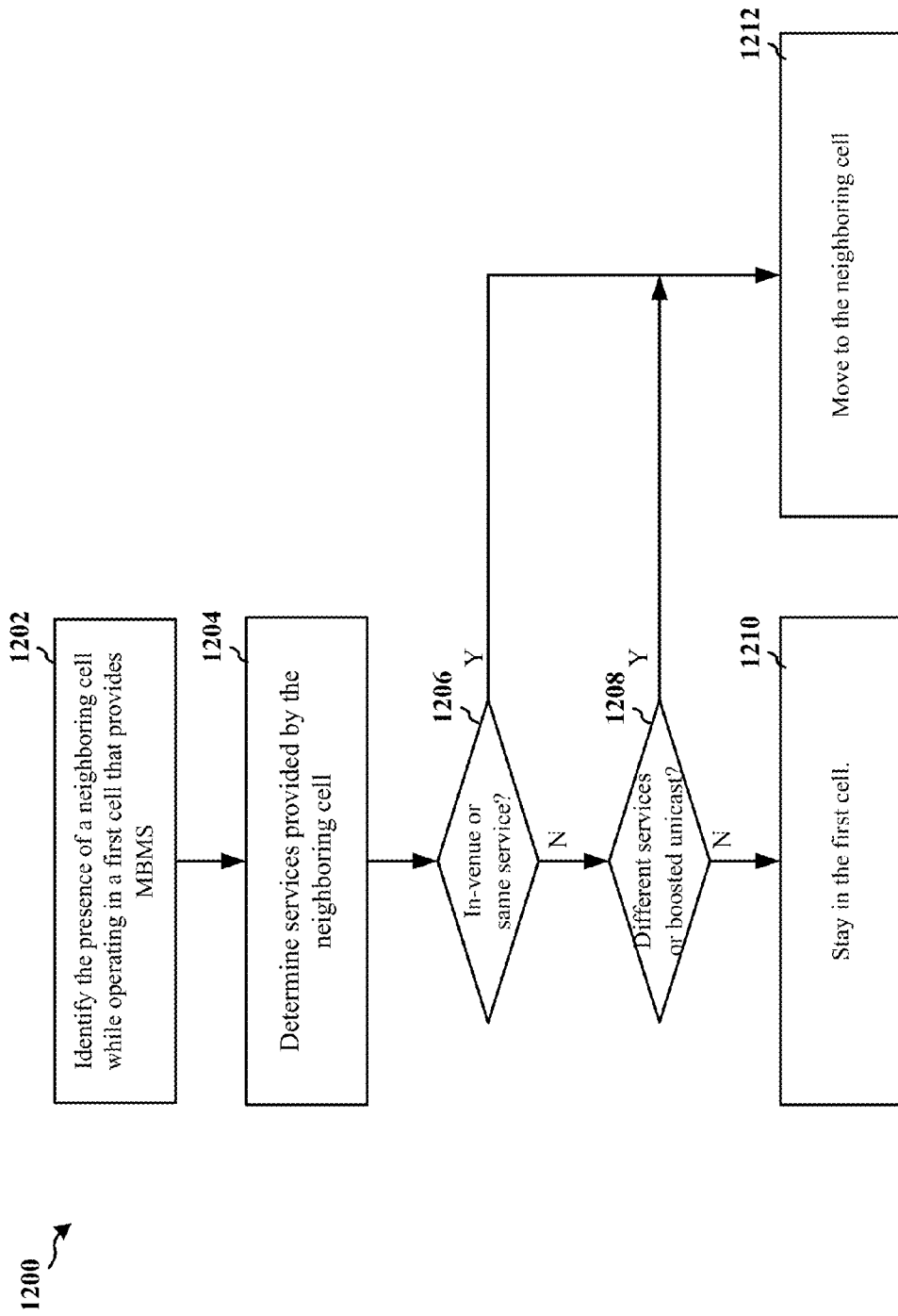
FIG. 12 is a flow chart of a method of wireless communication.

FIG. 12 is a flow chart 1200 of a method of wireless communication. The method may be performed by a UE. At step 1202, the UE 902 identifies the presence of a neighboring cell while the UE 902 is operating in a first cell that provides MBMS services.

At step 1204, the UE 902 determines the services provided by the neighboring cell. The UE may determine whether the neighboring cell provides an MBMS service that is different from, or the same as the MBMS service provided in the first cell. The UE may determine whether the neighboring cell provides in-venue service or boosted unicast service. The determination may be based on information maintained by the UE and characterizes the neighboring cell. The determination may be made based on a PCI received from the neighboring cell and information related to the PCI received in a SIB from the first cell. The information related to the PCI may comprise a mapping between PCIs corresponding to a plurality of neighboring cells and one or more SAIs of the MBMS.

At step 1206, the UE determines whether to move to the neighboring cell at step 1212 based on whether the neighboring cell provides in-venue or a same MBMS service provided in the first cell.

At step 1208, the UE determines whether to move to the neighboring cell at step 1212 or stay in the first cell (step 1210) based on whether the neighboring cell provides different services than provided in the first cell or provides a boosted unicast service.

At step 1212, the UE 902 moves to the neighboring cell. The UE may move when the UE is receiving MBMS service in the first cell, and when the neighboring cell is determined to provide the in-venue service or a broadcast or multicast service that is also provided in the first cell. The UE may move when the UE is receiving broadcast or multicast service in the first cell, and when the neighboring cell is determined to provide the boosted unicast service or a different broadcast or multicast service than provided in the first cell.

In some embodiments, the first cell comprises a heterogeneous network including a macro cell and one or more small cells. The neighboring cell and/or first cell may be a pico cell.

In some embodiments, the UE receives a SIB while the UE is operating in the first cell. The SIB may include an SAI associated with one or more cells. The SIB may include a PCI of the neighboring cell. The UE may determine whether the neighboring cell provides in-venue service or boosted unicast service based on the PCI. The PCI may be one of a first plurality of PCIs reserved by a network operator for cells providing in-venue service, or one of a second plurality of PCIs used by cells providing boosted unicast service. The PCI may be one of a plurality of predefined PCIs reserved for cells providing in-venue service. The SIB may comprise information mapping the SAI to a PCI associated with the neighboring cell. The information mapping the SAI to a PCI associated with the neighboring cell may be generated based on characteristics of the neighboring cell. The information mapping the SAI to a PCI associated with the neighboring cell may be provided by a network entity based on characteristics of the neighboring cell reported by the neighboring cell. The information mapping the SAI to a PCI associated with the neighboring cell may be provided by a base station of the first cell.

In some embodiments, the SIB may comprise information identifying a frequency associated with the first cell, a frequency associated with the neighboring cell and at least one SAI. The SIB may identify an SAI of the neighboring cell, whereby the SAI of the neighboring cell corresponds to an in-venue service.

In some embodiments, the UE moves to the neighboring cell when the neighboring cell is determined to provide the in-venue service when the first cell does not provide the in-venue service. The UE may indicate the availability of the in-venue service to a user of the UE. The UE may determine whether to select the in-venue service based on predefined preferences of a network operator or user, and may move to the neighboring cell when the UE selects the in-venue service. In some embodiments, the UE may terminate a national service available in the first cell when the UE selects in-venue service.

In some embodiments, the UE moves to the neighboring cell when the neighboring cell is determined to provide the MBMS service that is different from the MBMS service provided in the first cell. The UE may indicate the availability of the MBMS services provided by the neighboring cells to a user of the UE. The UE may determine whether to select the MBMS service based on predefined preferences of a network operator or user, and may move to the neighboring cell when the UE selects the MBMS service. In some embodiments, the UE may terminate national service available in the first cell when the UE selects MBMS service that is different from the MBMS service provided in the first cell.

Figure 13:
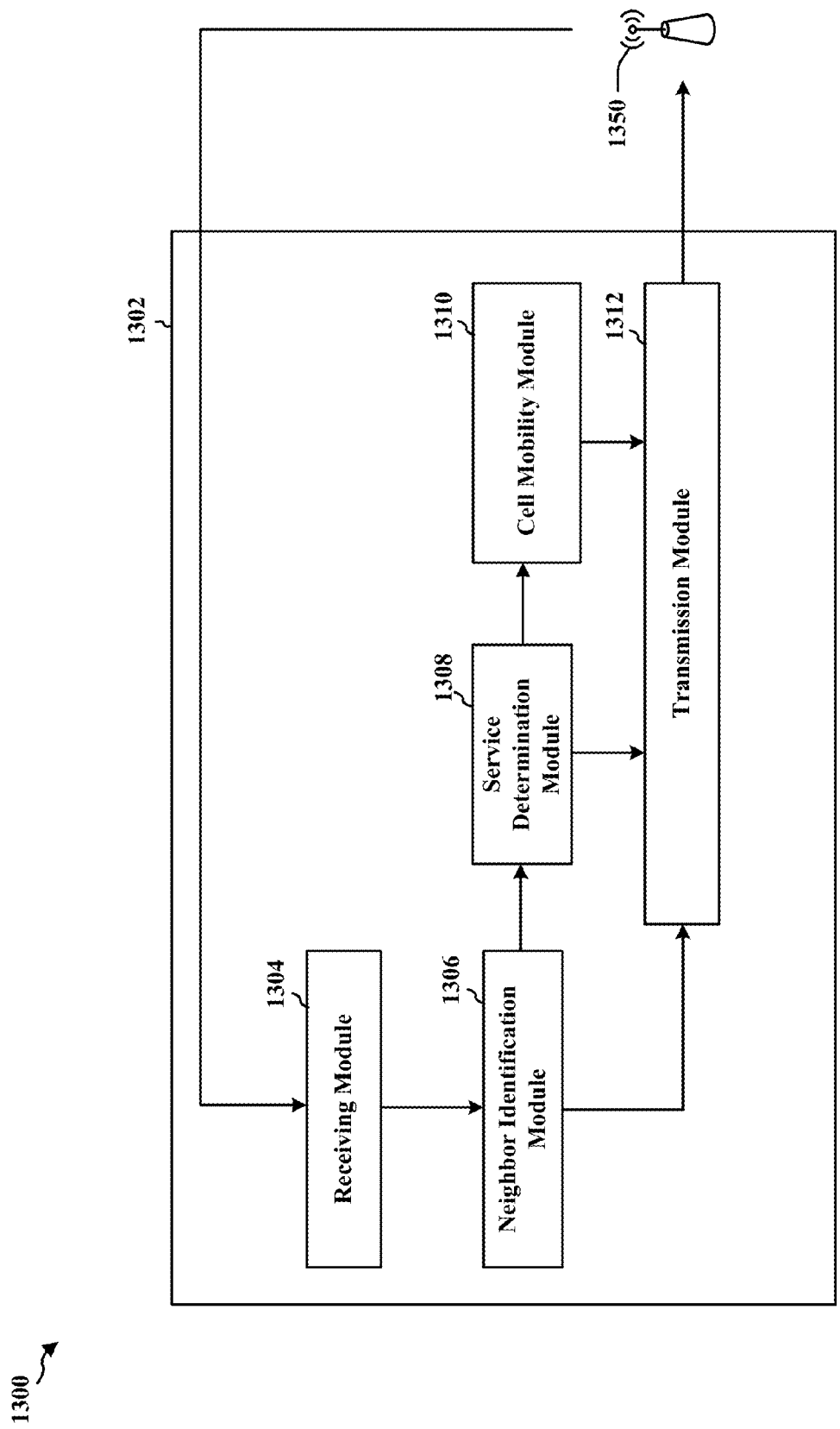
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus includes a receiving module 1304 that receives data and control form a wireless network, a neighbor discovery and identification module 1306 that identifies neighboring cells, a service determination module 1308 that determines MBMS and other services provided by the neighboring cell, a cell mobility module 1310 that moves the UE between cells, and a transmission module 1312 that transmits data on a wireless network.

The apparatus may include additional modules that perform each of the steps of the algorithm in the aforementioned flow chart of FIG. 12. As such, each step in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
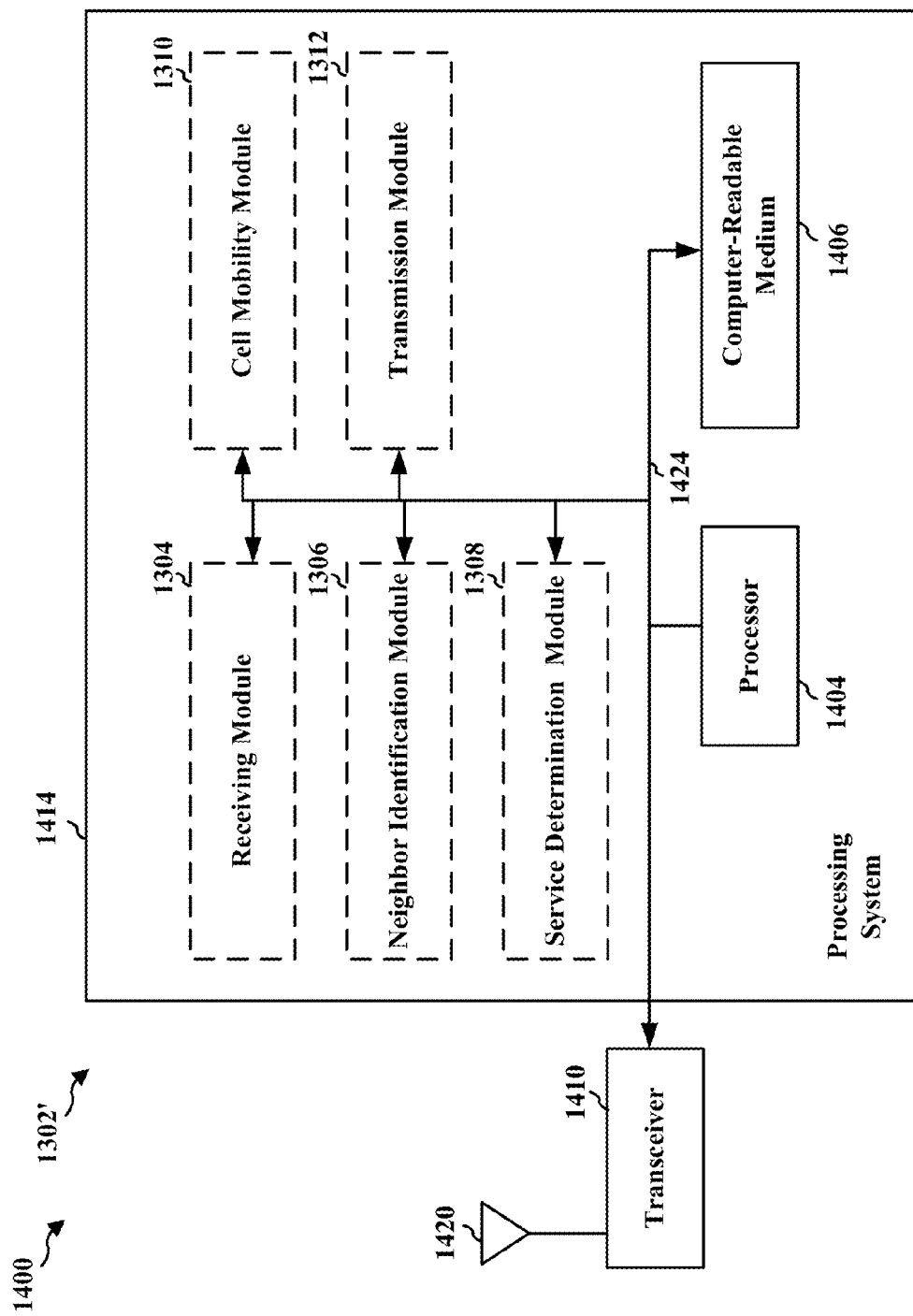
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, and 1312. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means 1304 receiving wireless signals, means 1306 for identifying the presence of a neighboring cell while in an MBMS network, means 1308 for determining at a UE whether the neighboring cell provides an MBMS service and the types of service provided, means 1310 for moving the UE to the neighboring cell, and means 1312 for transmitting data on the wireless network.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   identifying presence of a neighboring cell while operating in a first cell that provides multimedia broadcast/multicast service (MBMS);
   receiving a system information block (SIB) while operating in the first cell, the SIB including a service area identity (SAI) identifying one or more cells where MBMS service is available and information mapping the SAI to a physical cell identity (PCI) associated with the neighboring cell, the SAI further identifying an MBMS service type of the neighboring cell to which the PCI is assigned;
   determining, at a user equipment (UE), one or more services provided by the neighboring cell based at least on the information mapping the SAI to the PCI associated with the neighboring cell included within the SIB, wherein determining the one or more services includes determining whether the neighboring cell provides an MBMS service that is different from or the same as the MBMS service provided in the first cell, an in-venue service corresponding to one or more additional multimedia feeds, or a boosted unicast service corresponding to an increased capacity for unicast traffic, based on information maintained by the UE corresponding to the neighboring cell;
   determining, at the UE, whether to move to the neighboring cell based on determining the one or more services provided by the neighboring cell;
   when the UE is receiving MBMS service in the first cell, moving to the neighboring cell based on determining that the neighboring cell provides the in-venue service or a broadcast or multicast service that is also provided in the first cell, the broadcast or multicast service corresponding to at least one MBMS service provided by a cell that provides greater multimedia feeds than another cell; and
   when the UE is receiving broadcast or multicast service in the first cell, moving to the neighboring cell based on determining that the neighboring cell provides the boosted unicast service or a different broadcast or multicast service than provided in the first cell.

2. The method of claim 1, wherein the first cell comprises a heterogeneous network including a macro cell and one or more small cells.

3. The method of claim 2, wherein at least the neighboring cell is included in the one or more small cells.

4. The method of claim 1, wherein the SIB includes a PCI of the neighboring cell, and wherein the UE determines whether the neighboring cell provides in-venue service or boosted unicast service based on the PCI.

5. The method of claim 4, wherein the PCI is one of a first plurality of PCIs reserved by a network operator for cells providing in-venue service, or one of a second plurality of PCIs used by cells providing boosted unicast service.

6. The method of claim 4, wherein the PCI is one of a plurality of predefined PCIs reserved for cells providing in-venue service.

7. The method of claim 1, wherein the information mapping the SAI to the PCI associated with the neighboring cell is generated based on one or more characteristics of the neighboring cell.

8. The method of claim 1, wherein the information mapping the SAI to the PCI associated with the neighboring cell is provided by a network entity based on one or more characteristics of the neighboring cell reported by the neighboring cell.

9. The method of claim 1, wherein the information mapping the SAI to the PCI associated with the neighboring cell is provided by a base station of the first cell.

10. The method of claim 1, wherein the SIB comprises information identifying a frequency associated with the first cell, a frequency associated with the neighboring cell and at least one SAI.

11. The method of claim 10, wherein the SIB identifies an SAI of the neighboring cell, the SAI of the neighboring cell corresponding to an in-venue service.

12. The method of claim 1, further comprising moving to the neighboring cell when the neighboring cell is determined to provide the in-venue service when the first cell does not provide the in-venue service.

13. The method of claim 12, wherein moving to the neighboring cell when the first cell does not provide the in-venue service includes:
    determining whether to select the in-venue service based on predefined preferences of a network operator or user; and
    moving to the neighboring cell when the UE selects the in-venue service.

14. The method of claim 13, further comprising terminating a national service available in the first cell when the UE selects in-venue service.

15. The method of claim 1, further comprising moving to the neighboring cell when the neighboring cell is determined to provide the MBMS service that is different from the MBMS service provided in the first cell.

16. The method of claim 15, wherein moving to the neighboring cell when the neighboring cell is determined to provide the MBMS service that is different from the MBMS service provided in the first cell includes:
    determining whether to select the MBMS service based on predefined preferences of a network operator or user; and
    moving to the neighboring cell when the UE selects the MBMS service.

17. The method of claim 16, further comprising terminating a service available in the first cell when the UE selects an MBMS service provided by the neighboring cell that is different from the MBMS service provided in the first cell.

18. An apparatus for wireless communication, comprising:
    means for identifying presence of a neighboring cell while operating in a first cell that provides multimedia broadcast/multicast service (MBMS);
    means for receiving a system information block (SIB) while operating in the first cell, the SIB including a service area identity (SAI) identifying one or more cells where MBMS service is available and information mapping the SAI to a physical cell identity (PCI) associated with the neighboring cell, the SAI further identifying an MBMS service type of the neighboring cell to which the PCI is assigned;
    means for determining, at a user equipment (UE), one or more services provided by the neighboring cell based at least on the information mapping the SAI to the PCI associated with the neighboring cell included within the SIB, wherein the means for determining the one or more services includes means for determining whether the neighboring cell provides an MBMS service that is different from or the same as the MBMS service provided in the first cell, an in-venue service corresponding to one or more additional multimedia feeds, or a boosted unicast service corresponding to an increased capacity for unicast traffic, based on information maintained by the UE corresponding to the neighboring cell;
    means for determining, at the UE, whether to move to the neighboring cell based on determining the one or more services provided by the neighboring cell; and
    means for moving to the neighboring cell, wherein the UE is moved to the neighboring cell when the UE is receiving MBMS service in the first cell and based on determining that the neighboring cell provides the in-venue service or a broadcast or multicast service that is also provided in the first cell, the broadcast or multicast service corresponding to at least one MBMS service provided by a cell that provides greater multimedia feeds than another cell, and wherein the UE is moved to the neighboring cell when the UE is receiving broadcast or multicast service in the first cell and based on determining that the neighboring cell provides the boosted unicast service or a different broadcast or multicast service than provided in the first cell.

19. The apparatus of claim 18, wherein the first cell comprises a heterogeneous network including a macro cell and one or more small cells.

20. The apparatus of claim 19, wherein at least the neighboring cell is included in the one or more small cells.

21. The apparatus of claim 18, wherein the SIB includes a physical cell identity (PCI) of the neighboring cell, and wherein the UE determines whether the neighboring cell provides in-venue service or boosted unicast service based on the PCI.

22. The apparatus of claim 21, wherein the PCI is one of a first plurality of PCIs reserved by a network operator for cells providing in-venue service, or one of a second plurality of PCIs used by cells providing boosted unicast service.

23. The apparatus of claim 21, wherein the PCI is one of a plurality of predefined PCIs reserved for cells providing in-venue service.

24. The apparatus of claim 18, wherein the information mapping the SAI to the PCI associated with the neighboring cell is generated based on one or more characteristics of the neighboring cell.

25. The apparatus of claim 18, wherein the information mapping the SAI to the PCI associated with the neighboring cell is provided by a network entity based on one or more characteristics of the neighboring cell reported by the neighboring cell.

26. The apparatus of claim 18, wherein the information mapping the SAI to the PCI associated with the neighboring cell is provided by a base station of the first cell.

27. The apparatus of claim 18, wherein the SIB comprises information identifying a frequency associated with the first cell, a frequency associated with the neighboring cell and at least one SAI.

28. The apparatus of claim 27, wherein the SIB identifies an SAI of the neighboring cell, the SAI of the neighboring cell corresponding to an in-venue service.

29. The apparatus of claim 18, wherein the means for moving to the neighboring cell moves the UE to the neighboring cell when the neighboring cell is determined to provide the in-venue service when the first cell does not provide the in-venue service.

30. The apparatus of claim 29, wherein the means for moving to the neighboring cell determines whether to select the in-venue service based on predefined preferences of a network operator or user, and moves to the neighboring cell when the UE selects the in-venue service.

31. The apparatus of claim 30, wherein the means for moving to the neighboring cell terminates a national service available in the first cell when the UE selects in-venue service.

32. The apparatus of claim 18, wherein the means for moving to the neighboring cell moves the UE to the neighboring cell when the neighboring cell is determined to provide the MBMS service that is different from the MBMS service provided in the first cell.

33. The apparatus of claim 32, wherein the means for moving to the neighboring cell determines whether to select the MBMS service based on predefined preferences of a network operator or user, and moves to the neighboring cell when the UE selects the MBMS service.

34. The apparatus of claim 33, wherein the means for moving to the neighboring cell terminates a national service available in the first cell when the UE selects MBMS service that is different from the MBMS service provided in the first cell.

35. An apparatus for wireless communication, comprising:
 a memory; and
 at least one processor coupled to the memory and configured to:
  identify presence of a neighboring cell while operating in a first cell that provides multimedia broadcast/multicast service (MBMS);
  receive a system information block (SIB) while operating in the first cell, the SIB including a service area identity (SAI) identifying one or more cells where MBMS service is available and information mapping the SAI to a physical cell identity (PCI) associated with the neighboring cell, the SAI further identifying an MBMS service type of the neighboring cell to which the PCI is assigned;
  determine, at a user equipment (UE), one or more services provided by the neighboring cell based at least on the information mapping the SAI to the PCI associated with the neighboring cell included within the SIB, wherein to determine the one or more services, the at least one processor is further configured to determine whether the neighboring cell provides an MBMS service that is different from or the same as the MBMS service provided in the first cell, an in-venue service corresponding to one or more additional multimedia feeds, or a boosted unicast service corresponding to an increased capacity for unicast traffic, based on information maintained by the UE corresponding to the neighboring cell;
  determine, at the UE, whether to move to the neighboring cell based on determining the one or more services provided by the neighboring cell;
  move the UE to the neighboring cell based on determining that the neighboring cell provides the in-venue service or a broadcast or multicast service that is also provided in the first cell, the broadcast or multicast service corresponding to at least one MBMS service provided by a cell that provides greater multimedia feeds than another cell, when the UE is receiving MBMS service in the first cell; and
  move the UE to the neighboring cell based on determining that the neighboring cell provides the boosted unicast service or a different broadcast or multicast service than provided in the first cell, when the UE is receiving broadcast or multicast service in the first cell.

36. A non-transitory computer-readable medium storing computer executable code for wireless communication, the computer executable code comprising instructions for:
 identifying presence of a neighboring cell while operating in a first cell that provides multimedia broadcast/multicast service (MBMS);
 receiving a system information block (SIB) while operating in the first cell, the SIB including a service area identity (SAI) identifying one or more cells where MBMS service is available and information mapping the SAI to a physical cell identity (PCI) associated with the neighboring cell, the SAI further identifying an MBMS service type of the neighboring cell to which the PCI is assigned;
 determining, at a user equipment (UE), one or more services provided by the neighboring cell based at least on the information mapping the SAI to the PCI associated with the neighboring cell included within the SIB, wherein determining the one or more services includes determining whether the neighboring cell provides an MBMS service that is different from or the same as the MBMS service provided in the first cell, an in-venue service corresponding to one or more additional multimedia feeds, or a boosted unicast service corresponding to an increased capacity for unicast traffic, based on information maintained by the UE corresponding to the neighboring cell;
 determining, at the UE, whether to move to the neighboring cell based on determining the one or more services provided by the neighboring cell;
 when the UE is receiving MBMS service in the first cell, moving to the neighboring cell based on determining that the neighboring cell provides the in-venue service or a broadcast or multicast service that is also provided in the first cell, the broadcast or multicast service corresponding to at least one MBMS service provided by a cell that provides greater multimedia feeds than another cell; and
 when the UE is receiving broadcast or multicast service in the first cell, moving to the neighboring cell based on determining that the neighboring cell provides the boosted unicast service or a different broadcast or multicast service than provided in the first cell.

37. A method of wireless communication, comprising:
 identifying presence of a neighboring cell while a user equipment (UE) is operating in a first cell that provides multimedia broadcast/multicast service (MBMS);
 identifying one or more services provided by the neighboring cell based on a physical cell identifier (PCI) received from the neighboring cell and information related to the PCI received in a system information block (SIB) from the first cell including a mapping between PCIs corresponding to a plurality of neighboring cells and one or more service area identities (SAIs) of the MBMS, the one or more SAIs identifying one or more cells where MBMS service is available and an MBMS service type of the neighboring cell to which the PCI assigned; and
 determining whether to move the UE to the neighboring cell based on the one or more services, wherein the UE is moved to the neighboring cell based on whether the neighboring cell provides an MBMS service that is different from or the same as the MBMS service provided in the first cell, provides an in-venue service corresponding to one or more additional multimedia feeds, or a boosted unicast service corresponding to an increased capacity for unicast traffic.

38. The method of claim 37, wherein the UE is moved to the neighboring cell when the neighboring cell is determined to provide the boosted unicast service.

39. The method of claim 37, wherein the UE is moved to the neighboring cell when the neighboring cell is determined to provide a broadcast that is different from a broadcast provided in the first cell.

40. The method of claim 37, wherein the UE is moved to the neighboring cell when the neighboring cell is determined to provide a multicast service that is different from a multicast service provided in the first cell.

41. An apparatus for wireless communication, comprising:
  means for identifying presence of a neighboring cell while a user equipment (UE) is operating in a first cell that provides multimedia broadcast/multicast service (MBMS);
  means for identifying one or more services provided by the neighboring cell based on a physical cell identifier (PCI) received from the neighboring cell and information related to the PCI received in a system information block (SIB) from the first cell including a mapping between PCIs corresponding to a plurality of neighboring cells and one or more service area identities (SAIs) of the MBMS, the one or more SAIs identifying one or more cells where MBMS service is available and an MBMS service type of the neighboring cell to which the PCI assigned; and
  means for determining whether to move the UE to the neighboring cell based on the one or more services, wherein the UE is moved to the neighboring cell based on whether the neighboring cell provides an MBMS service that is different from or the same as the MBMS service provided in the first cell, provides an in-venue service corresponding to one or more additional multimedia feeds, or a boosted unicast service corresponding to an increased capacity for unicast traffic.

42. The apparatus of claim 41, wherein the UE is moved to the neighboring cell when the neighboring cell is determined to provide the boosted unicast service.

43. The apparatus of claim 41, wherein the UE is moved to the neighboring cell when the neighboring cell is determined to provide a broadcast that is different from a broadcast provided in the first cell.

44. The apparatus of claim 41, wherein the UE is moved to the neighboring cell when the neighboring cell is determined to provide a multicast service that is different from a multicast service provided in the first cell.

45. An apparatus for wireless communication, comprising:
  a memory; and
  at least one processor coupled to the memory and configured to:
    identify presence of a neighboring cell while a user equipment (UE) is operating in a first cell that provides multimedia broadcast/multicast service (MBMS);
    identify one or more services provided by the neighboring cell based on a physical cell identifier (PCI) received from the neighboring cell and information related to the PCI received in a system information block (SIB) from the first cell including a mapping between PCIs corresponding to a plurality of neighboring cells and one or more service area identities (SAIs) of the MBMS, the one or more SAIs identifying one or more cells where MBMS service is available and an MBMS service type of the neighboring cell to which the PCI assigned; and
    determine whether to move the UE to the neighboring cell based on the one or more services, wherein the UE is moved to the neighboring cell based on whether the neighboring cell provides an MBMS service that is different from or the same as the MBMS service provided in the first cell, provides an in-venue service corresponding to one or more additional multimedia feeds, or a boosted unicast service corresponding to an increased capacity for unicast traffic.

46. A non-transitory computer-readable medium storing computer executable code for wireless communication, the computer executable code comprising instructions for:
  identifying presence of a neighboring cell while a user equipment (UE) is operating in a first cell that provides multimedia broadcast/multicast service (MBMS);
  identifying one or more services provided by the neighboring cell based on a physical cell identifier (PCI) received from the neighboring cell and information related to the PCI received in a system information block (SIB) from the first cell including a mapping between PCIs corresponding to a plurality of neighboring cells and one or more service area identities (SAIs) of the MBMS, the one or more SAIs identifying one or more cells where MBMS service is available and an MBMS service type of the neighboring cell to which the PCI assigned; and
  determining whether to move the UE to the neighboring cell based on the one or more services, wherein the UE is moved to the neighboring cell based on whether the neighboring cell provides an MBMS service that is different from or the same as the MBMS service provided in the first cell, provides an in-venue service corresponding to one or more additional multimedia feeds, or a boosted unicast service corresponding to an increased capacity for unicast traffic.

* * * * *